(12) United States Patent
Matsumoto et al.

(10) Patent No.: US 8,559,027 B2
(45) Date of Patent: Oct. 15, 2013

(54) INFORMATION PROCESSING DEVICE, PRINTING SYSTEM, AND PRINTING CONTROL METHOD

(75) Inventors: Masanori Matsumoto, Osaka (JP);
Tsutomu Yoshimoto, Osaka (JP);
Tomoko Toizumi, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 698 days.

(21) Appl. No.: 12/846,378

(22) Filed: Jul. 29, 2010

(65) Prior Publication Data
US 2011/0038000 A1 Feb. 17, 2011

(30) Foreign Application Priority Data
Aug. 13, 2009 (JP) ................................. 2009-187688

(51) Int. Cl.
*G03G 15/00* (2006.01)
(52) U.S. Cl.
USPC ......................... 358/1.13; 358/1.14; 358/1.15
(58) Field of Classification Search
None
See application file for complete search history.

(56) References Cited

U.S. PATENT DOCUMENTS

| | | | |
|---|---|---|---|
| 7,062,190 B2 * | 6/2006 | Miyamoto | 399/81 |
| 7,349,110 B2 * | 3/2008 | Nozato | 358/1.13 |
| 7,706,002 B2 * | 4/2010 | Nozato | 358/1.13 |
| 7,856,202 B2 * | 12/2010 | Mizobuchi et al. | 399/389 |

FOREIGN PATENT DOCUMENTS

| | | |
|---|---|---|
| JP | 2002-007081 A | 1/2002 |
| JP | 2002-304092 A | 10/2002 |
| JP | 2003-248576 A | 9/2003 |
| JP | 2006-338270 A | 12/2006 |

* cited by examiner

*Primary Examiner* — Marivelisse Santiago Cordero
*Assistant Examiner* — Kent Yip
(74) *Attorney, Agent, or Firm* — Edwards Wildman Palmer LLP; David G. Conlin; Edmund J. Koundakjian

(57) ABSTRACT

A printing system includes a plurality of printers, a plurality of information processing devices and a managing device which are interconnected via a network for data communication. Each of the information processing devices determines whether the number of printing sheets used in printing processes having been requested by the information processing device of concern belongs to a small number category or a large number category. If the number of printing sheets used is determined as belonging to the large number category, the information processing device of concern displays a window informing a user of the number of printing sheets used. On the other hand, if the number of printing sheets used is determined as belonging to the small number category, the information processing device of concern displays a window informing the user of the printing sheet saving rate.

7 Claims, 13 Drawing Sheets

SECOND AGGREGATE CALCULATION RESULT

| | TOTAL NUMBER OF PRINTING SHEETS | PRINTING SHEET SAVING RATE | NUMBER OF PRINTING SHEETS REDUCED | USAGE RATE OF ACHROMATIC PRINTING FUNCTION |
|---|---|---|---|---|
| INFORMATION PROCESSING DEVICE 2A | 397 | 84 | 333 | 85 |
| INFORMATION PROCESSING DEVICE 2B | 678 | 74 | 501 | 78 |
| INFORMATION PROCESSING DEVICE 2C | 589 | 42 | 247 | 68 |
| . . . | . . . | . . . | . . . | . . . |
| AVERAGE | 496 | 76 | 483 | 81 |

INFORMATION PROCESSING DEVICE, PRINTING SYSTEM, AND PRINTING CONTROL METHOD

CROSS REFERENCE

This Nonprovisional application claims priority under 35 U.S.C. §119(a) on Patent Application No. 2009-187688 filed in Japan on Aug. 13, 2009, the entire contents of which are hereby incorporated by reference.

BACKGROUND OF THE INVENTION

The present invention relates to an information processing device configured to request a printer to carry out a printing process, a printing system, and a printing control method.

From the viewpoint of global environmental protection focused in recent years, the printing technology field is increasingly demanded to save resources including printing materials used by printers such as printing sheet and coloring material.

Conventional printers have functions of reducing the number of printing sheets to be used for printing, such as an aggregate printing function for collectively printing a plurality of print pages on one side of a printing sheet, and a double-sided printing function for printing images on both sides of a printing sheet. The aggregate printing function and the double-sided printing function can be utilized in combination. Some printers of the type having a color printing function can reduce the consumption of coloring material, such as color ink and color toner, by printing a color image data item of less importance as an achromatic image, thereby making it possible to save resources.

Recent printers have an increasing number of functional items (including the above-described aggregate printing function, double-sided printing and color printing function) that can be set before the start of a printing process as they are rendered multi-functional, thus forcing users to perform complicated setting operations for the respective functions. As a result, the users often do printing in a previously established print form without performing such setting operations for the respective functions, which results in insufficient utilization of those functions which can contribute to the saving of resources used by printers.

A known arrangement for improving the user's operability is such that before the start of printing, the energy saving degree attained by a print form with settings currently established for the respective functions is checked and, if a predetermined energy saving degree is not reached, a dialog is displayed for receiving entry of a change to another print form for improving the energy saving degree (see Japanese Patent Laid-Open Publication No. 2002-304092 for example).

Another known arrangement is capable of aggregate calculation of the number of printing sheets reduced and the printing sheet saving rate on a user-by-user basis (see Japanese Patent Laid-Open Publication No. 2003-248576 for example).

However, among users who intentionally use the functions of reducing the number of printing sheets to be used in printing (such as the above-described aggregate printing function and the double-sided printing function), there are users who repeat wasteful printing. Only with the arrangement which performs aggregate calculation of the number of printing sheets reduced and the printing sheet saving rate and then outputs the result of the aggregate calculation as described in the latter patent document, such users who repeat wasteful printing cannot be made aware that reducing wasteful printing is effective means for improving the degree of contribution to the resources saving.

A feature of the present invention is to provide an information processing device, a printing system and a printing control method which are capable of making users aware that reducing wasteful printing is substantially effective means for saving resources even though they are users who repeat wasteful printing and hence exhibit a substantially low degree of contribution to the resources saving.

SUMMARY OF THE INVENTION

An information processing device according to the present invention is configured as follows.

The information processing device stores in a storage section a result of aggregate calculation of items of information on printing processes which the information processing device has requested a printer connected thereto via a network to carry out. When the information processing device receives entry of an instruction to print to be forwarded to the printer, a determination section determines whether or not the number of printing sheets used in printing processes having been requested by the information processing device during a predetermined determination period (during the last week or month for example) is more than a reference level based on the result of aggregate calculation stored in the storage section. In response to a determination by the determination section that the number of printing sheets used is not more than the reference level, a display control section causes a display to provide a first screen informing a user of a printing sheet saving rate in the printing processes having been requested by the information processing device during the predetermined determination period. On the other hand, in response to a determination by the determination section that the number of printing sheets used is more than the reference level, the display control section causes the display to provide a second screen informing the user of the number of printing sheets used in the printing processes having been requested by the information processing device during the predetermined determination period.

Thus, for a user whose usage of printing sheets in printing processes during the determination period is not more than the reference level, that is, for a user who repeats wasteful printing with a low probability, the display provides the first screen informing the user of a printing sheet saving rate in the printing processes having been requested by the information processing device. Therefore, the information processing device is capable of urging such a user who reduces wasteful printing to further utilize the functions of saving resources, thereby making the user intend to increase the degree of contribution to the resources saving.

For a user whose usage of printing sheets in the printing processes during the determination period is not more than the reference level, that is, for a user who repeats wasteful printing with a high probability, the display provides the second screen informing the user of the number of printing sheets used in the printing processes having been requested by the information processing device. By so doing, the user can be properly made aware that the number of printing sheets used in the printing processes is too large (i.e., the probability of repeated wasteful printing is high). Therefore, the information processing device is capable of making such a user recognize that reducing wasteful printing is substantially effective means for saving resources.

A printing system is constructed which comprises a plurality of information processing devices, at least one printer and a managing device which are interconnected via a network for data communication, the managing device being configured to obtain a print log having a record of items of information on each of printing processes from the printer and perform aggregate calculation of the items of information on the printing processes based on the print logs with respect to each of the information processing devices. The managing device may be configured to perform aggregate calculation of the items of information on the printing processes with respect to each of the information processing devices on a printer-by-printer basis or not on the printer-by-printer basis. Preferably, the managing device is configured to inform each of the information processing devices of a result of the aggregate calculation and store the result in a storage section. With this feature, it is possible to set the reference level to an average number of printing sheets used with respect to each of the information processing devices or a like value. By so doing, it is possible to enhance the precision of determination as to whether or not the user repeats wasteful printing with a high probability.

Each of the first and second screens provided by the display of each of the information processing devices may include an image of a selection entry member for receiving entry of selection of a print form which uses a smaller number of printing sheets than a print form currently selected. With this feature, it is possible to enhance the operability associated with selection of a print form having a high degree of contribution to the resources saving. The image of the selection entry member is an image for receiving entry of selection of an aggregate printing function for collectively printing a plurality of print pages on one side of a printing sheet and a double-sided printing function for printing images on both sides of a printing sheet, an image for receiving entry of selection of an achromatic printing function, or a like image.

The foregoing and other features and attendant advantages of the present invention will become more apparent from the reading of the following detailed description of the invention in conjunction with the accompanying drawings.

DETAILED DESCRIPTION OF THE INVENTION

Hereinafter, an embodiment of the present invention will be described.

Figure 1:
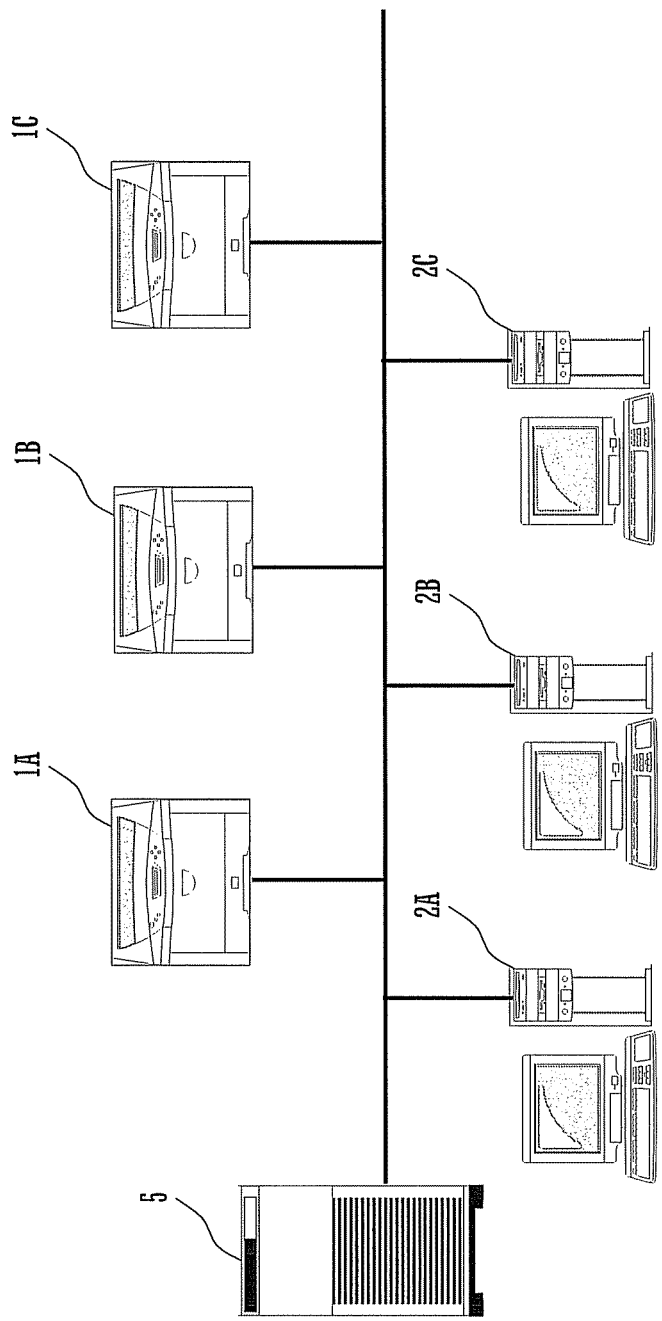
FIG. 1 is a block diagram of a printing system according to an embodiment of the present invention.

FIG. 1 is a diagram illustrating a printing system according to an embodiment of the present invention. The printing system shown comprises a plurality of printers 1 (1A, 1B and 1C), a plurality of information processing devices 2 (2A, 2B and 2C) and a managing device 5 which are interconnected via a network for data communication. These devices connected to the network are assigned their respective own IDs and network addresses.

Figure 2:
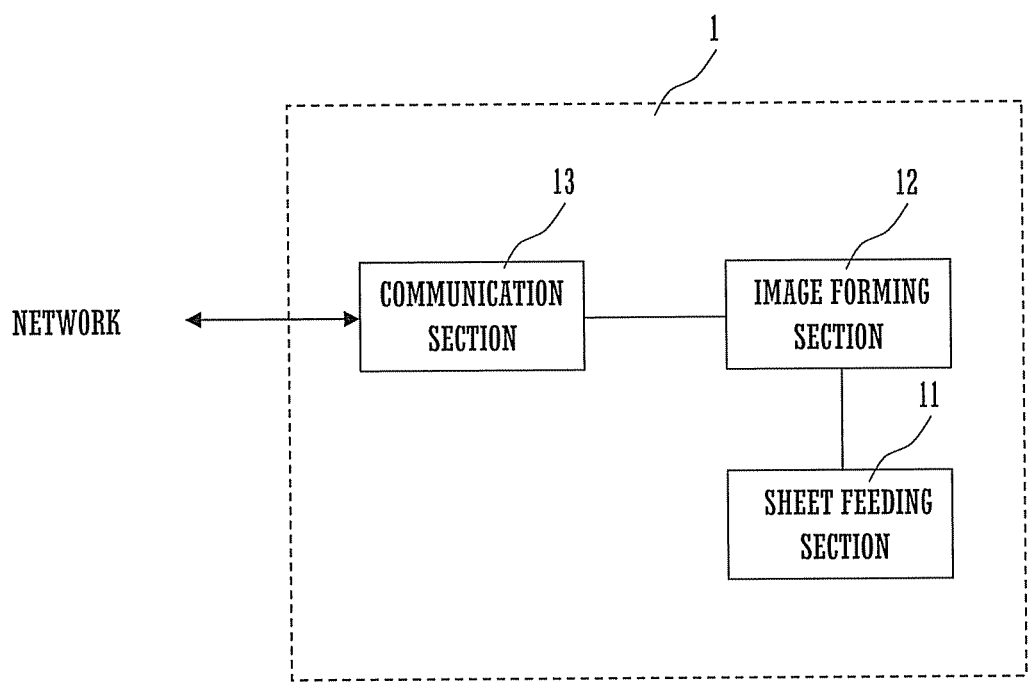
FIG. 2 is a diagram illustrating a configuration of a relevant portion of a printer.

FIG. 2 is a diagram illustrating a configuration of a relevant portion of a printer. The printer 1 shown includes a sheet feeding section 11, an image forming section 12, and a communication section 13. The printer 1 feeds a printing sheet, examples of which include a paper sheet and a recording medium formed from a material other than paper such as OHP film, from the sheet feeding section 11 to the image forming section 12 and then carries out a printing process based on printing data at the image forming section 12 to form a color or achromatic image on the printing sheet. For instance, the printer 1 is a multi-functional apparatus configured to perform electrophotographic printing. The type of the printing process to be carried out by the printer 1 may be selected from a plurality of types irrespective of electrophotographic printing, ink jet printing or other type of printing. The communication section 13 is configured to perform data communication with the information processing devices 2 and managing device 5 connected to the printer 1 via the network.

Figure 3:
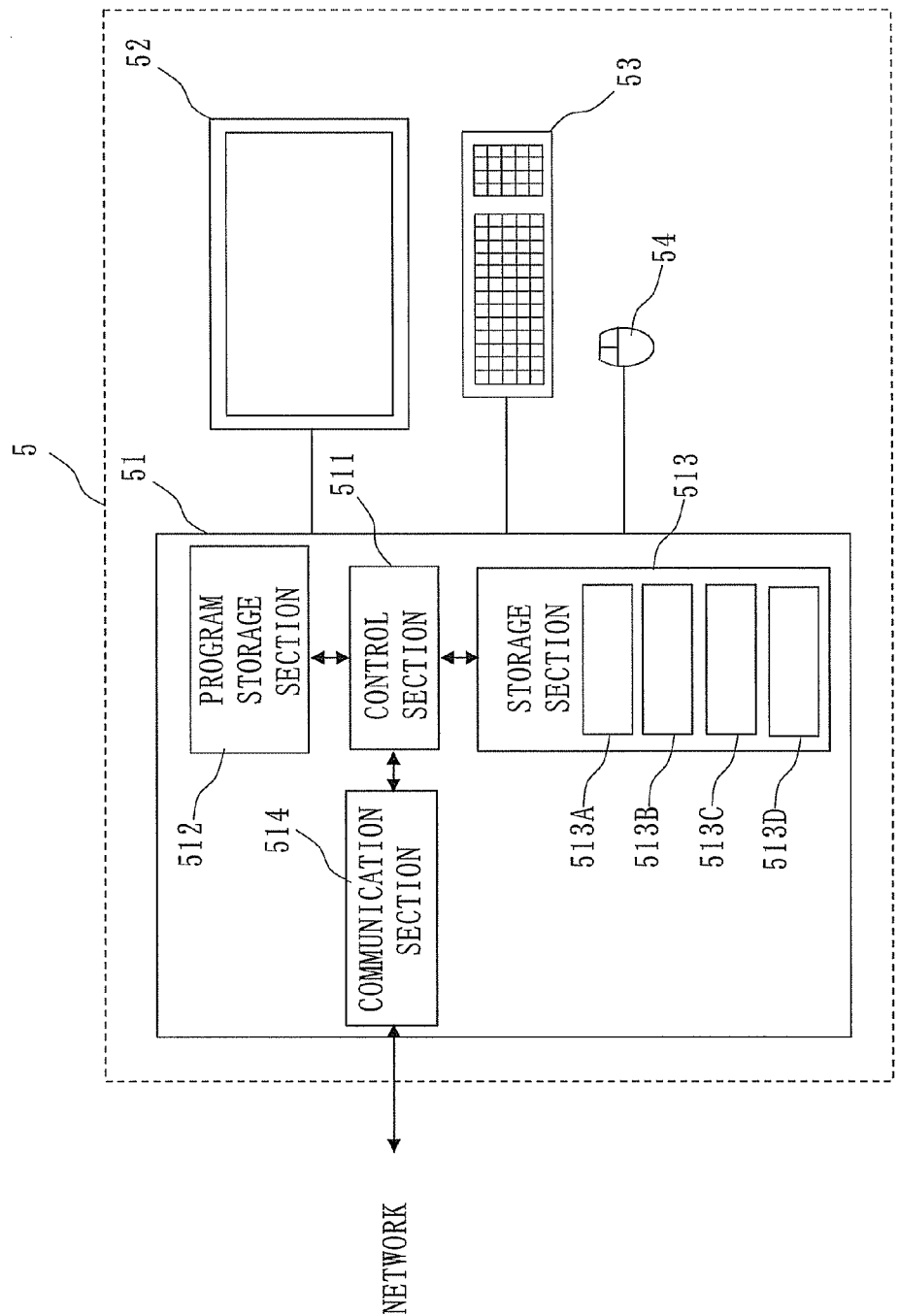
FIG. 3 is a diagram illustrating a configuration of a relevant portion of an information processing device.

FIG. 3 is a diagram illustrating a configuration of a relevant portion of an information processing device. The information processing device 2 shown, which is a personal computer for example, includes a main body 21, a display 22, a keyboard 23, and a mouse 24. The main body 21 includes a control section 211, a storage section 212, a program storage section 213, and a communication section 214. The control section 211 performs various controls including a control over operations of different sections of the main body 21, a display control over the display 22 connected to the main body 21, and an entry control associated with user's entry operations on the keyboard 23 or the mouse 24.

The program storage section 213 has installed therein an application program 213A for data preparation, a printer driver 213B for controlling the operation of the printer 1 during printing, and a printing control program 213C, together with an operating system (OS).

The control section 211 executes the programs stored in the program storage section 213. The control section 211 prepares image data containing document data in accordance with entry operations performed by the user by means of the keyboard 23 and the mouse 24 during the execution of the application program 213A for data preparation stored in the program storage section 213. The control section 211 converts the image data thus prepared to display data and then displays the display data on the display 22 while storing it in the storage section 212.

The control section 211 executes the printer driver 213B stored in the program storage section 213 to prepare printing data from the image data stored in the storage section 212 in accordance with entry operations performed by the user by means of the keyboard 23 and the mouse 24. The printing data thus prepared is outputted to that printer 1 which is instructed to perform printing from the communication section 214 via the network. The communication section 214 performs data communication with the printers 1 and managing device 5 connected thereto via the network.

Figure 4:
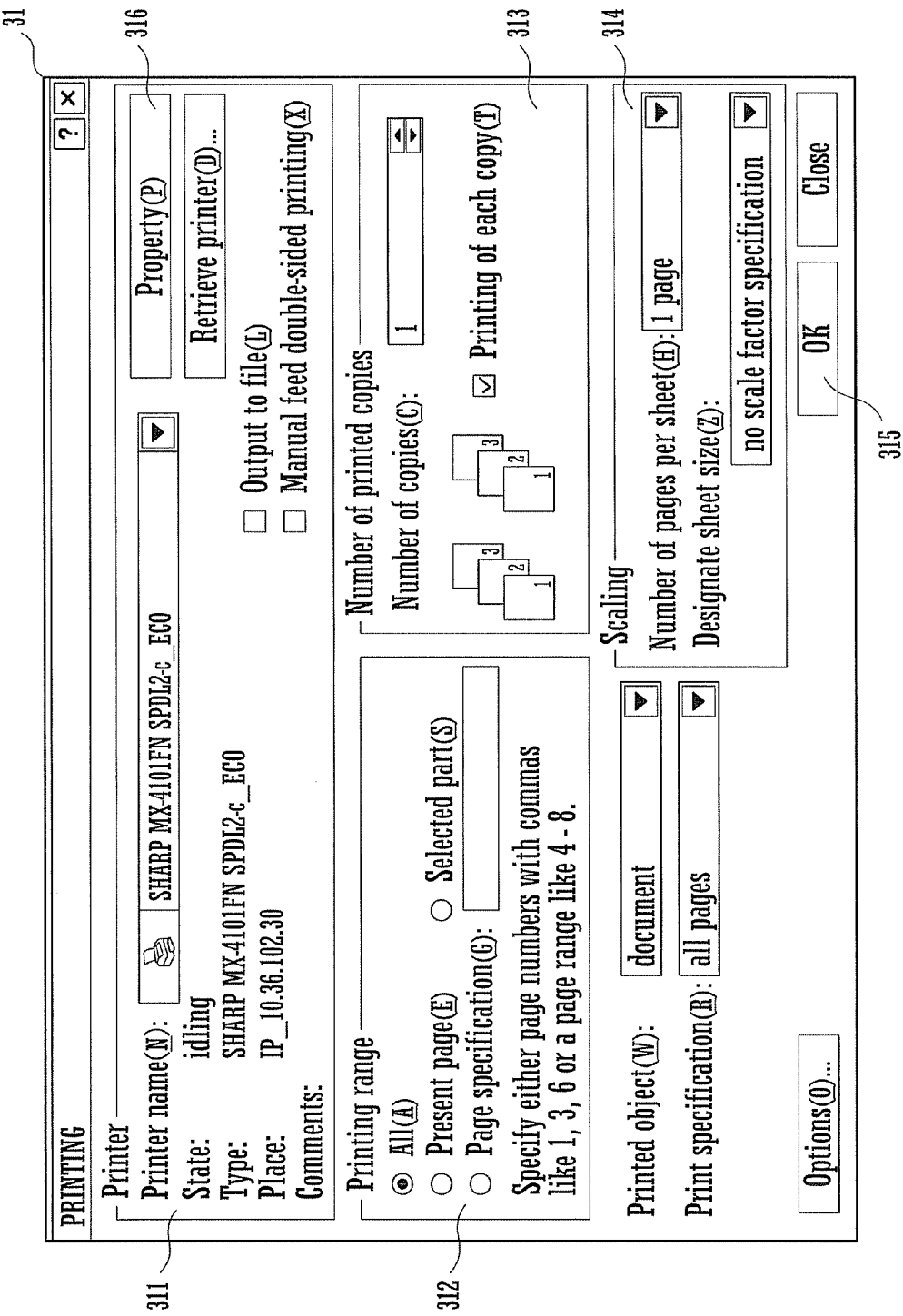
FIG. 4 is a view illustrating an exemplary print window displayed by a printer driver.

When a user gives an instruction to print by means of the keyboard 23 or the mouse 24 during the execution of the application program 213A, the printer driver 213B starts up to cause the display 22 to display a print window 31 illustrated as an example in FIG. 4. As shown in FIG. 4, the print window 31 is provided therein with a printer setting zone 311, a print range zone 312, a copies zone 313, a scale up/down zone 314, and the like, together with a print start button 315.

The print range zone 312 receives entry of designation of a print range in the image data prepared by an application program. The copies zone 313 receives entry of a specified number of copies of image data in the print range set at the print range zone 312. The scale up/down zone 314 shows particulars of settings established or calculation results with respect to the number of pages per sheet and a sheet size which form necessary information for determining a magnifying power for an image to be formed on a printing sheet. The printer setting zone 311 shows the name of printer 1 to be used for printing and receives entry of a change of printer when a plurality of printers 1 are present that can be handled by the information processing device 2. The printer setting zone 311 is provided with a properties button 316 for checking the details of setting. When the user selects the properties button 316 by using the mouse 24, the display 22 displays a main setting window 32 shown as an example in FIG. 5.

Figure 5:
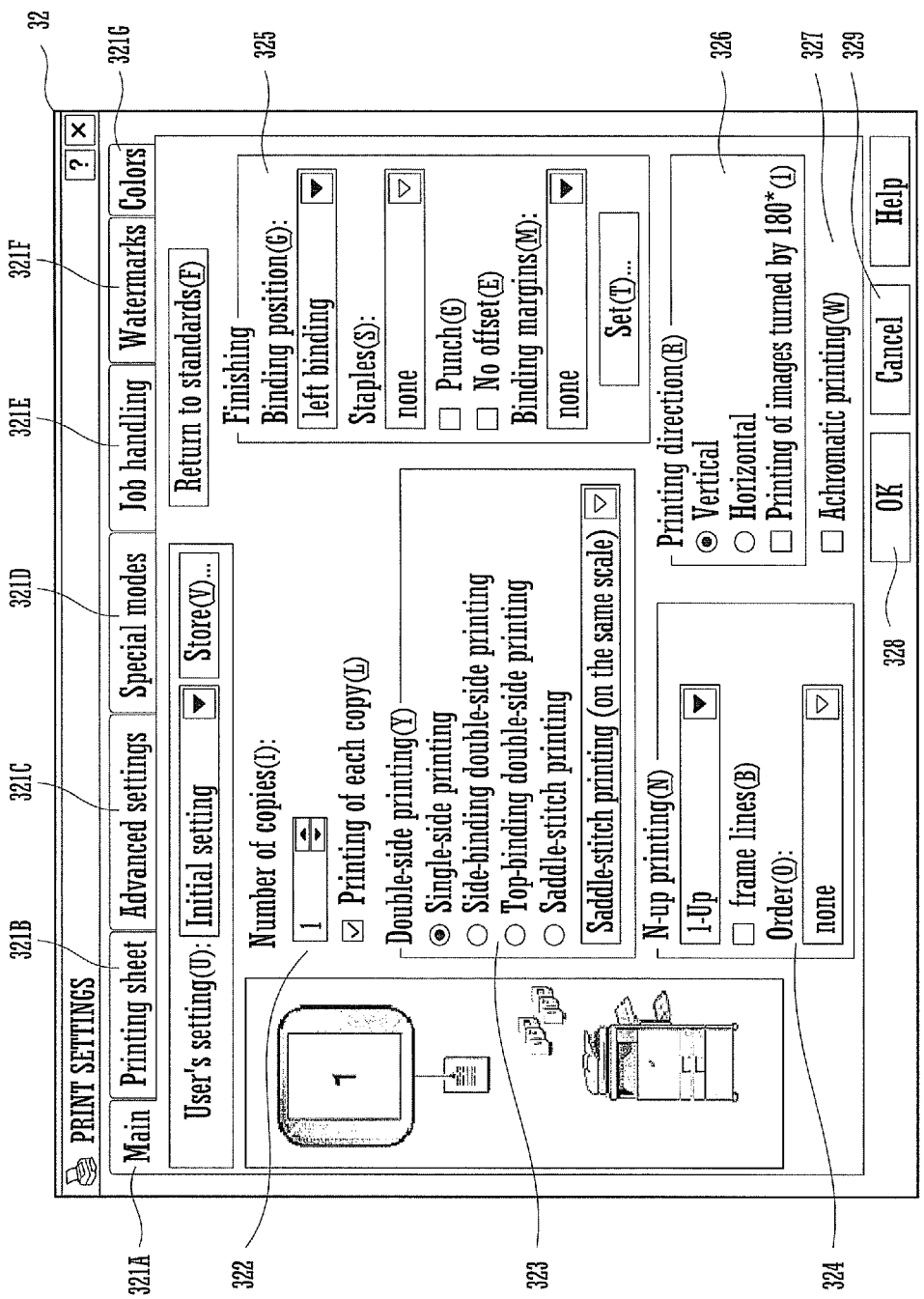
FIG. 5 is a view illustrating an exemplary main setting window displayed by the printer driver.

As shown in FIG. 5, the main setting window 32 is provided with a plurality of tabs 321A to 321G for displaying respective screens each providing information on use or non-use, or particulars of setting with respect to a respective one of available functions of printer 1 and each capable of receiving entry of a change of setting. For example, the main tab 321A provides a screen having zones 322 to 327, each of which receives entry of a change of setting for a respective one of functions including designation of number of copies, double-sided printing, aggregate printing, finishing, printing orientation and achromatic printing.

In the main setting window 32 there are provided an OK button 328 and a cancel button 329. The OK button 328 receives entry of a definitively changed setting. The cancel button 329 receives entry of cancellation of a changed setting. The OK button 328 and the cancel button 329 are setting completion buttons which are operated when confirmation of particulars of setting and a change of setting have been completed.

Figure 6:
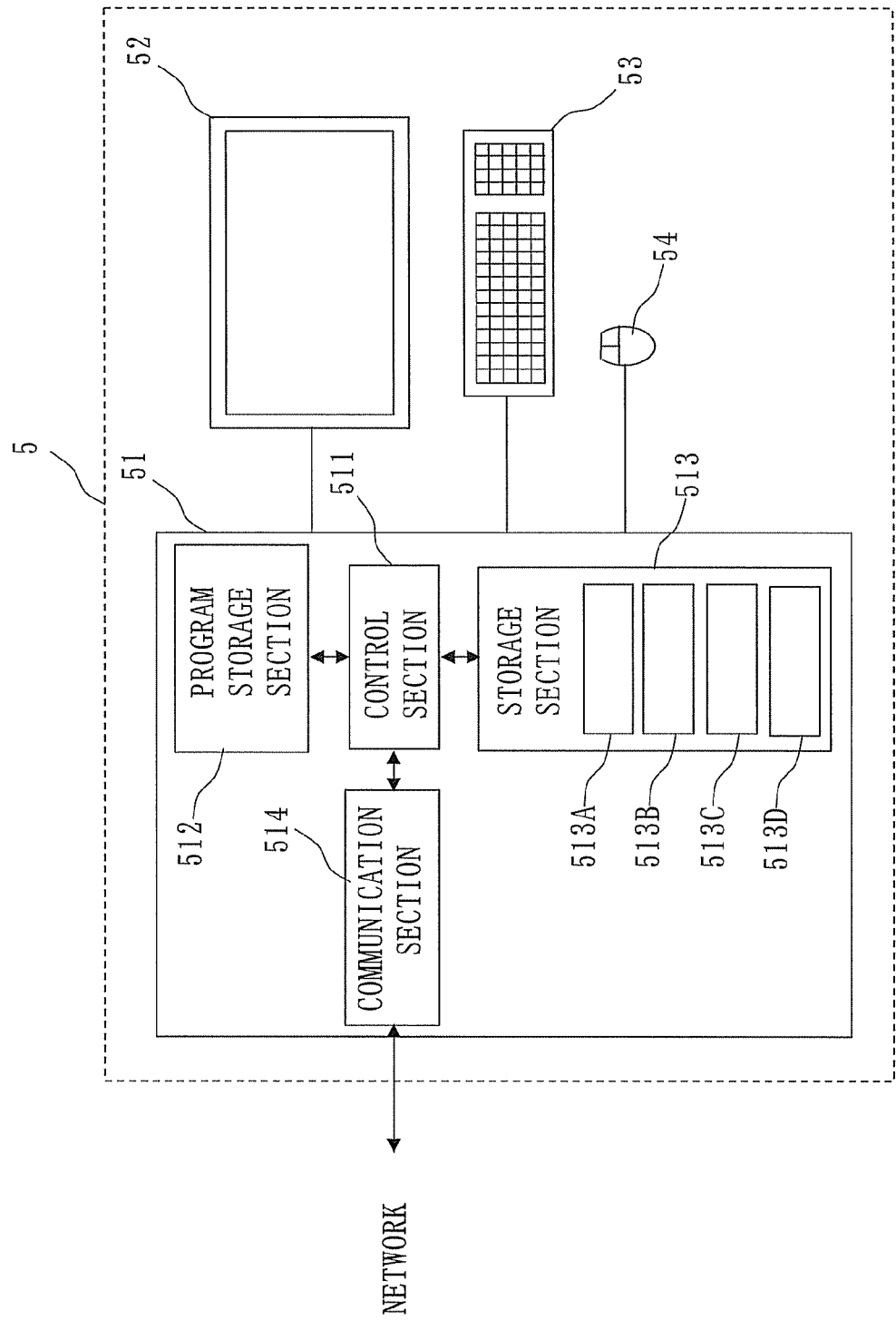
FIG. 6 is a diagram illustrating a configuration of a relevant portion of a managing device.

Description will be made of the managing device 5. FIG. 6 is a diagram illustrating a configuration of a relevant portion of the managing device. The managing device 5 includes a main body 51, a display 52, a keyboard 53, and a mouse 54. The main body 51 includes a control section 511, a program storage section 512, a storage section 513, and a communication section 514. The control section 511 performs various controls including a control over operations of different sections of the main body 51, a display control over the display 52 connected to the main body 51, and an entry control associated with user's entry operations on the keyboard 53 and the mouse 54.

The program storage section 512 has installed therein an application program for aggregate calculation of items of information on printing processes carried out by the printers 1 with respect to each information processing device 2, together with an operating system (OS). The storage section 513 has a print log storage area 513A, an aggregate calculation result storage area 513B, a setting data storage area 513C, and a calculating formula storage area 513D. When an individual printer 1 has carried out a printing process in response to a request for printing from a certain information processing device 2, the printer 1 informs the managing device 5 of a print log having a record of items of information on the printing process. Such a print log also has a record of the ID of that information processing device 2 which has made the request for printing, as well as a record of data indicating the time and date of printing and the like.

The print log storage area 513A cumulatively stores therein print logs transmitted from each printer 1. The aggregate calculation result storage area 513B stores therein a result of aggregate calculation of print logs cumulatively stored in the print log storage area 513A with respect to each information processing device 2. Such an aggregate calculation result will be described later. The setting data storage area 513C stores therein setting data for use in aggregate calculation of print logs cumulatively stored in the print log storage area 513A with respect to each information processing device 2. The calculating formula storage area 513D stores therein calculating formulae for calculating a printing sheet saving rate to be described later and the like. The communication section 514 performs data communication with the printers 1 and information processing devices 2 connected thereto via the network.

Figure 7:
FIG. 7 is a table showing a result of aggregate calculation stored in an aggregate calculation result storage area.

Here, description is directed to the aggregate calculation result stored in the aggregate calculation result storage area 513B. The aggregate calculation result storage area 513B stores therein first and second aggregate calculation results described below. FIG. 7 is a table showing the first aggregate calculation result stored in the aggregate calculation result storage area. The control section 511 performs aggregate calculation of print logs cumulatively stored in the print log storage area 513A on a printer-by-printer basis with respect to each information processing device 2, to obtain the first aggregate calculation result. As can be seen from FIG. 7, the first aggregate calculation result comprises a result of aggregate calculation of the number of image printed sides obtained by each of the aggregate printing functions (1-up, 2-up and 4-up), a result of aggregate calculation of the number of printing sheets used obtained by each of the single-/double-sided printing functions, and a result of aggregate calculation of the number of image printed sides obtained by each of the color/achromatic printing functions, which are obtained on a printer-by-printer basis with respect to each information processing device 2. In the case of the single-sided printing function, the number of image printed sides per printing sheet is counted as "1". In the case of the double-sided printing function, the number of image printed sides per printing sheet is counted as "2".

The first aggregate calculation result also comprises a sum total by printer obtained on a printer-by-printer basis by aggregate calculation of the number of image printed sides obtained by each of the aggregate printing functions (1-up, 2-up and 4-up), the number of printing sheets used obtained by each of the single-/double-sided printing functions and the number of image printed sides obtained by each of the color/achromatic printing functions, and a sum total by information processing device obtained with respect to each information processing device 2 by aggregate calculation of the number of image printed sides obtained by each of the aggregate printing functions (1-up, 2-up and 4-up), the number of printing sheets used obtained by each of the single-/double-sided printing functions and the number of image printed sides obtained by each of the color/achromatic printing functions.

Figure 8:
FIG. 8 is a table showing resulting ECO contribution degrees.

Further, the managing device 5 calculates the total number of printing sheets used, the printing sheet saving rate, the number of printing sheets reduced and the usage rate of the achromatic printing function with respect to each of the information processing devices 2 based on the first aggregate calculation result shown in FIG. 7, to obtain the second aggregate calculation result having a record of these values thus calculated. FIG. 8 is a table showing the second aggregate calculation result. The total number of printing sheets used is the total number of printing sheets used in response to a request for printing from the information processing device 2 of concern. The printing sheet saving rate is a percentage obtained by dividing the number of printing sheets used by the number of pages used to print image data in printing processes which the printers 1 have been requested to carry out. The number of printing sheets reduced is the number of printing sheets obtained by subtracting the number of printing sheets used from the number of pages used to print image data in the printing processes which the printers 1 have been request to carry out. The usage rate of the achromatic printing function is the rate of usage of the achromatic printing function in the printing processes which the information processing device 2 of concern has requested the printers 1 to carry out.

The managing device 5 prepares the above-described first and second aggregate calculation results at predetermined time intervals (e.g., time intervals of a month or a week). The managing device 5 informs each information processing device 2 of the second aggregate calculation result thus prepared.

Each information processing device 2 stores the second aggregate calculation result informed from the managing device 5 in the storage section 212.

Figure 9:
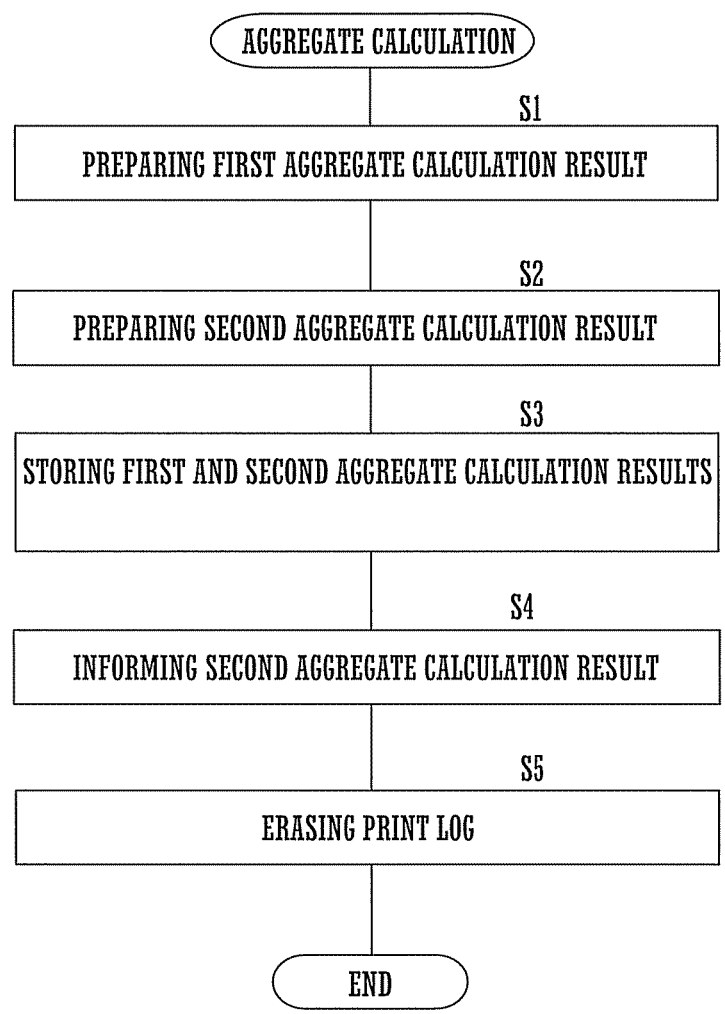
FIG. 9 is a flowchart of an aggregate calculation process.

Description will be made of operation of the printing system. In the printing system, the managing device 5 performs aggregate calculation to prepare the first and second aggregate calculation results at predetermined timing (on the first day of every month, on every Monday, or like timing). The timing at which the aggregate calculation is performed is stored in the setting data storage area 513C. FIG. 9 is a flowchart of the aggregate calculation process.

The managing device 5 has cumulatively stored print logs transmitted from each printer 1 in the print log storage area 513A. As will be described later, the managing device 5 deletes the print logs having been stored in the print log storage area 513A at the time the first and second aggregate calculation results have been prepared. Therefore, the print logs cumulatively stored in the print log storage area 513A are logs associated with printing processes that have been carried out by each printer 1 during a time period from the completion of the latest aggregate calculation process up to the current time. Accordingly, the first and second aggregate calculation results can be prepared at fixed time intervals of a month, a week or the like by setting the timing of aggregate calculation.

The managing device 5 reads the print logs stored in the print log storage area 513A sequentially to prepare the first aggregate calculation result (step S1). In step S1, aggregate calculation of print logs is performed on a printer-by-printer basis with respect to each information processing device 2. After the preparation of the first aggregate calculation result, the managing device 5 prepares the second aggregate calculation result by using the first aggregate calculation result (step S2). In step S2, the calculating formulae stored in the calculating formula storage section 513D are used to calculate the total number of printing sheets used, the printing sheet saving rate, the number of printing sheets reduced and the usage rate of the achromatic printing function, with respect to each information processing device 2. The managing device 5 stores the first and second aggregate calculation results thus prepared this time in the aggregate calculation result storage area 513B (step S3).

The managing device 5 informs the information processing devices 2 connected thereto via the network of the second aggregate calculation result prepared this time from the communication section 514 (step S4). Thereafter, the managing device 5 erases the print logs stored in the print log storage area 513A (step S5) and terminates the process. In step S5, the print logs that have been used to prepare the first and second aggregate calculation results this time are erased, but print logs received and stored in the middle of the aggregate calculation process currently carried out are not erased. That is, print logs that are received and stored in the middle of the current aggregate calculation process are not erased so as to be used in the next-time aggregate calculation process.

Each of the information processing devices 2 stores in its storage section 212 the second aggregate calculation result informed from the managing device 5.

The following description is directed to a process carried out by each information processing device 2 for requesting a certain printer 1 to perform printing.

Figure 10:
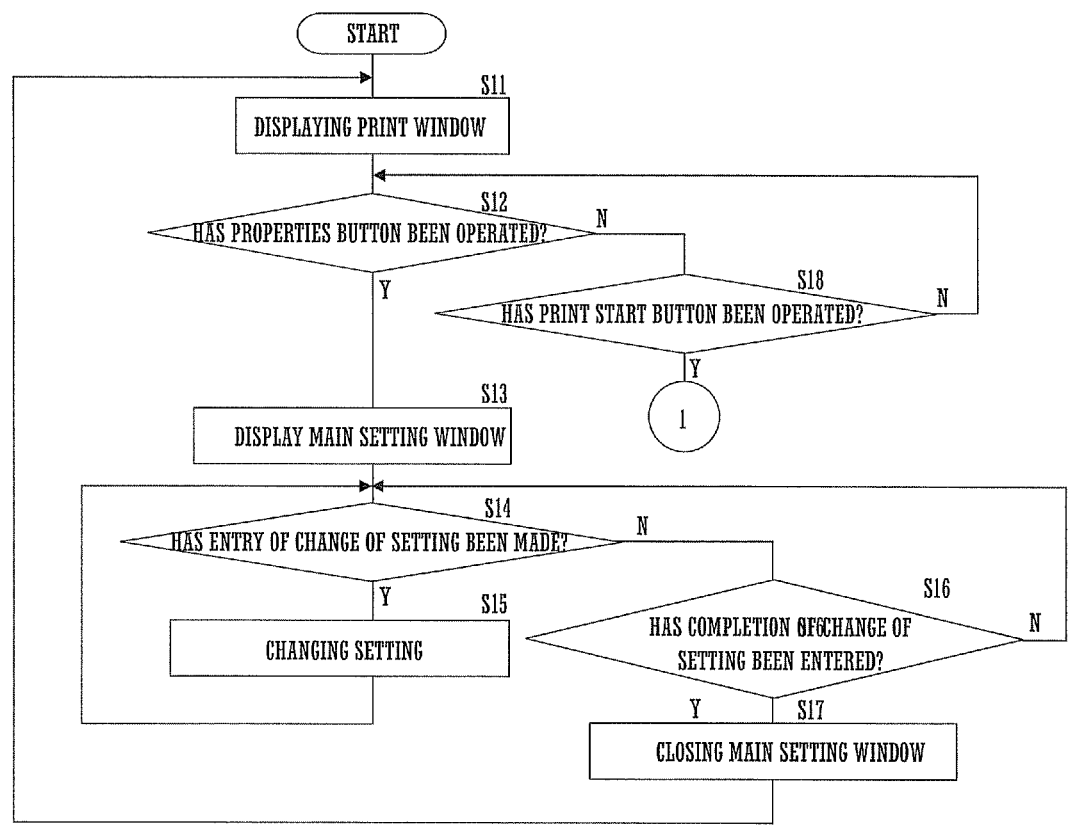
FIG. 10 is a flowchart of operation of the information processing device.
Figure 11:
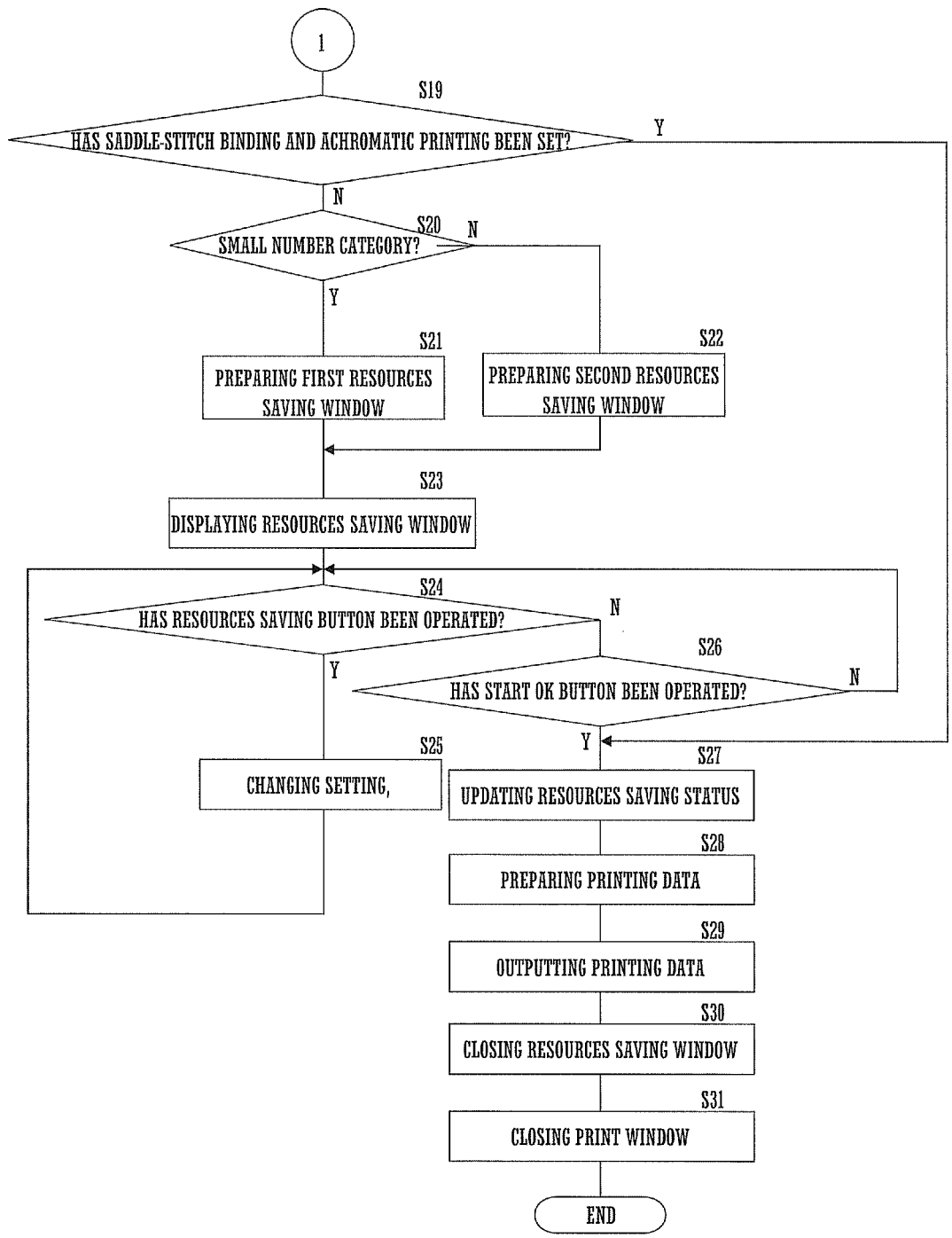
FIG. 11 is a flowchart of operation of the information processing device.

FIGS. 10 and 11 are flowcharts of operation of an information processing device. When the information processing device 2 is given a print instruction during the execution of the application program 213A, the control section 211 displays the print window 31 shown in FIG. 4 at the frontmost position on the display 22 (step S11) and waits for a user's operation. When a request for confirmation of particulars of setting is made by the user operating the properties button 316 in the print window (step S12), the control section 211 displays the main setting window 32 at the frontmost position on the display 22 (step S13) and waits for entry of a change of setting.

When the entry of a change of setting has been made in the main setting window 32 (step S14), the control section 211 changes the particulars of setting of each function stored in the storage section 212 (step S15). When the OK button 328 and the cancel button 329 in the main setting window 32, which are setting completion buttons, are operated (step S16), the main setting window 32 on the display 22 is closed and the process returns to step S11 (step S17). Thus, the print widow 31 is again displayed at the frontmost position on the display 22.

When the user operates the print start button 315 by means of the mouse 24 with the print window 31 being displayed on the display 22 (step S18), the control section 211 starts up the printing control program 213C stored in the program storage section 213.

When the printing control program 213C starts up, the control section 211 determines whether or not a saddle-stitch binding and achromatic printing function is alive (step S19). If it is not determined that the saddle-stitch binding and achromatic printing function is alive, the control section 211 determines whether the number of printing sheets used in printing processes having been requested by the information processing device 2 of concern belongs to a small number category or a large number category (step S20).

In step S20, if the total number of printing sheets used in the printing processes having been requested by the information processing device 2 of concern according to the latest second aggregate calculation result stored in the storage section 212 is not less than a fixed number, the number of printing sheets used is determined as belonging to the large number category. On the other hand, if the total number of printing sheets used is less than the fixed number, the number of printing sheets used is determined as belonging to the small number category. The fixed number may be a predetermined number (500 or 1,000 for example) or an average number of printing sheets used by the information processing devices 2.

If the number of printing sheets used is determined as belonging to the small number category in step S20, the information processing device 2 prepares a first resources saving function selection window 33 informing the user of the saving rate (step S21). On the other hand, if the number of printing sheets used is determined as belonging to the large number category, the information processing device 2 prepares a second resources saving function selection window 34 informing the user of the number of printing sheets used (step S22). The information processing device 2 displays the first resources saving function selection window 33 prepared in step S21 or the second resources saving function selection window 34 prepared in step S22 at the frontmost position on the display 22 (step S23).

Figure 12:
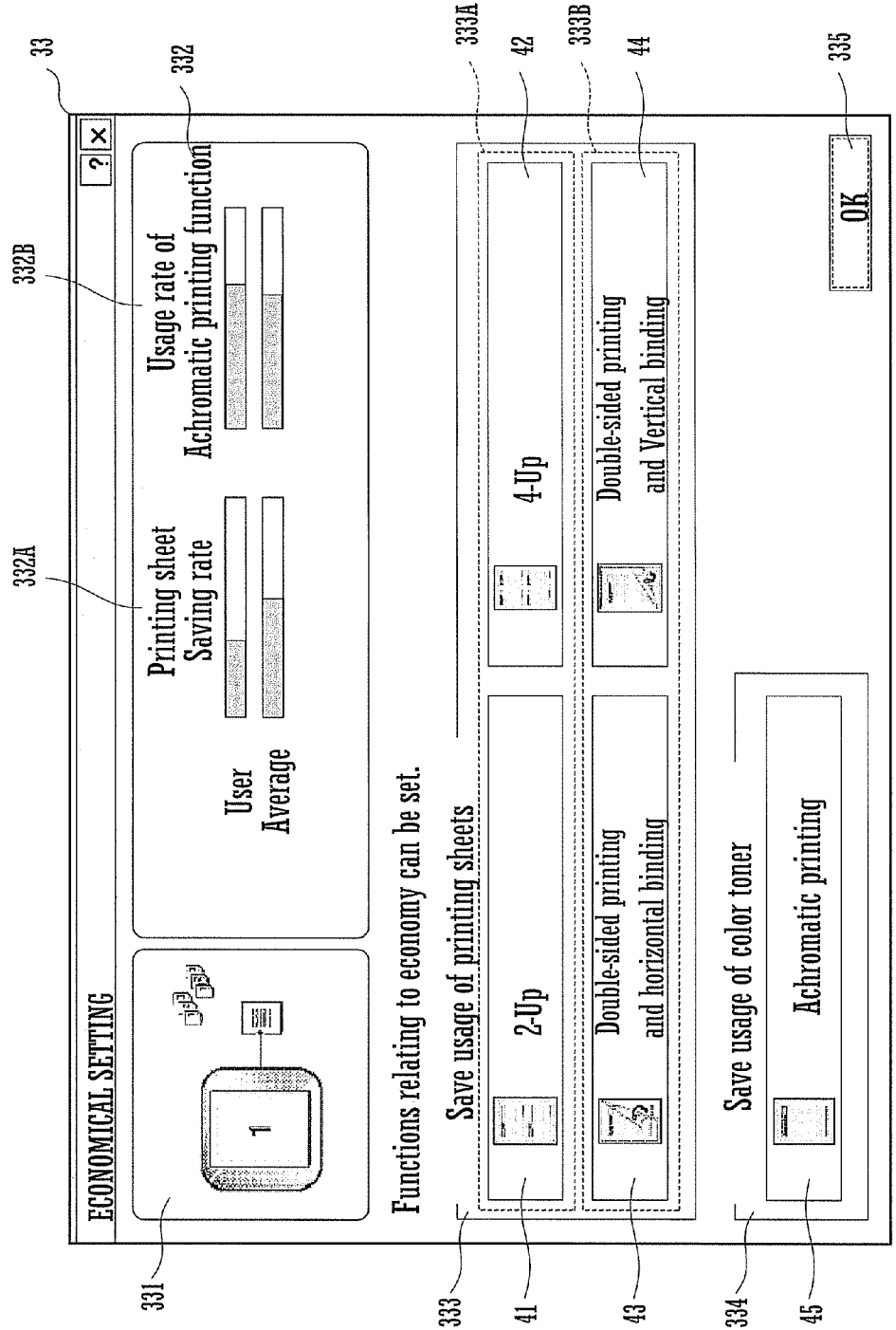
FIG. 12 is a view illustrating an exemplary resources saving function setting window displayed by a printing control program.
Figure 13:
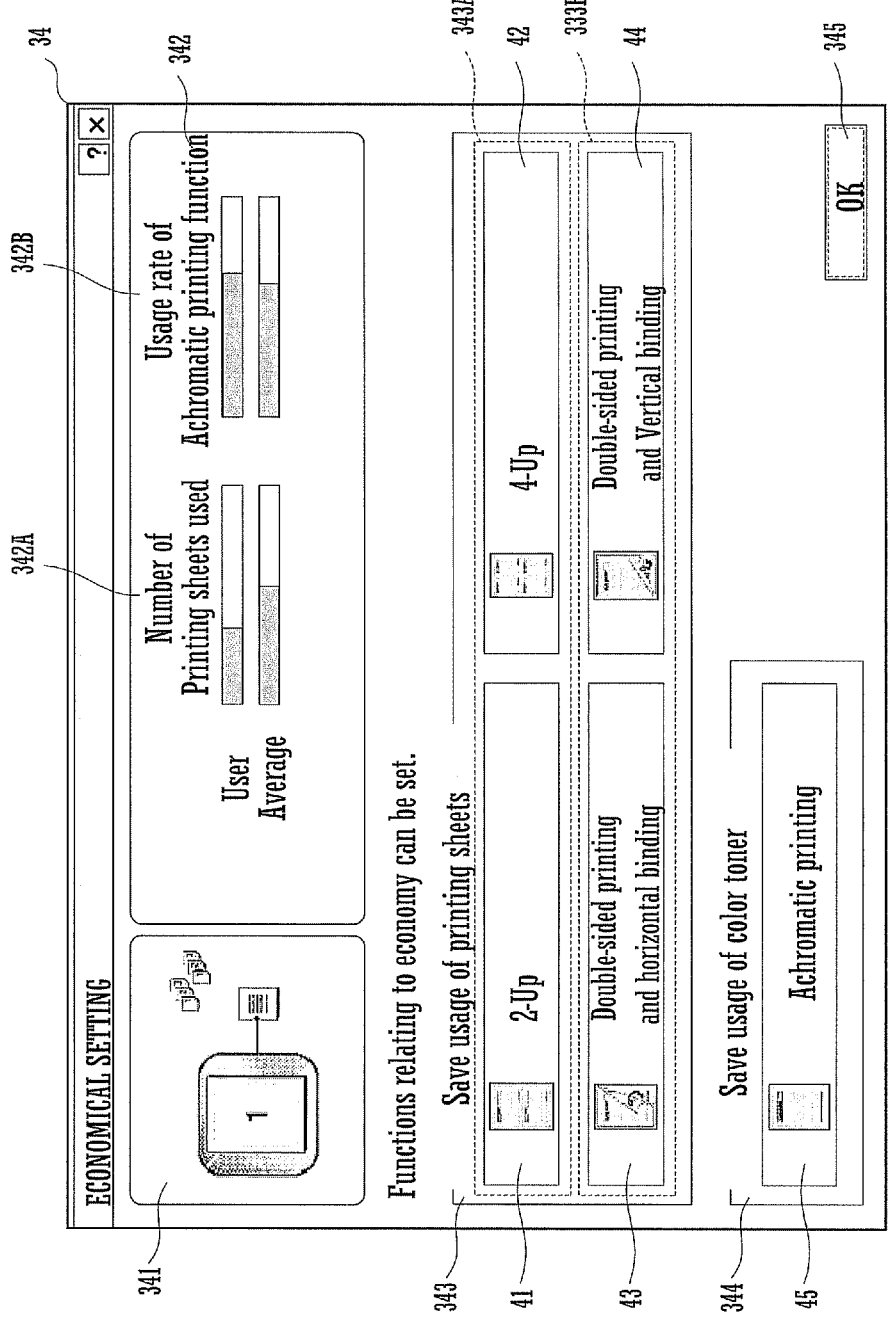
FIG. 13 is a view illustrating an exemplary resources saving function setting window displayed by the printing control program.

FIG. 12 illustrates an example of the first resources saving function selection window 33 displayed at the frontmost position on the display 22. FIG. 13 illustrates an example of the second resources saving function selection window 34 displayed at the frontmost position on the display 22.

The first resources saving function selection window 33 has a print condition display zone 331, a resources saving status display zone 332, a printing sheet saving zone 333, a coloring material saving zone 334, and a print start OK button 335. The print condition display zone 331 graphically illustrates print conditions that result when those functions are performed which are selected by the user from functions that can be performed by each printer 1 and can contribute to the resources saving.

The printing sheet saving zone 333, which is a zone for receiving entry of setting related to a function that can contribute to the resources saving by reducing the number of printing sheets to be used in printing, includes an aggregate printing function setting zone 333A and a double-sided printing function setting zone 333B. The aggregate printing function setting zone 333A receives entry of setting related to the aggregate printing function for printing of printing data in an amount of plural pages on one side of a printing sheet by scaling the printing data down. The aggregate printing function setting zone 333A displays images of 2-Up button 41 and 4-Up button 42 for example. The aggregate printing function is a function related to a print condition on one side of a printing sheet.

The double-sided printing function setting zone 333B receives entry of setting related to the double-sided printing function for printing of different printing data items on both sides of an unused printing sheet and displays images of a double-sided printing and horizontal binding button 43 and a double-sided printing and vertical binding button 44 for example. The double-sided printing function is related to the sides of a printing sheet to be subjected to printing. The coloring material saving zone 334 receives entry of setting related to a function that can contribute to the resources saving by reducing the amount of usage of a coloring material, such as toner or ink, in a printing process carried out by each printer 1 and displays the image of an achromatic printing button 45. The achromatic printing function is the function of saving the amount of usage of color toner or color ink by converting color image data to achromatic printing data to be printed as an achromatic image. The achromatic printing function is a function related to the status of use of the coloring material.

The 2-Up button 41, 4-Up button 42, double-sided printing and horizontal binding button 43, double-sided printing and vertical binding button 44 and achromatic printing button 45 in the resources saving function selection window 33 are resources saving buttons which allow selection of functions that can contribute to the resources saving.

The print start OK button 335 is operated when the user gives a definitive instruction to start printing by the printer 1. In response to the operation on the print start OK button 335, image data is converted to printing data by functions set and is outputted to the printer 1.

The resources saving status display zone 332 displays the status of the resources saving in printing processes having been performed by the printer 1. The resources saving status display zone 332 includes a printing sheet saving rate display zone 332A and an achromatic printing function setting rate display zone 332B. Here, the printing sheet saving rate display zone 332A shows the printing sheet saving rate of the information processing device of concern according to the latest second aggregate calculation result stored in the storage section 212 and the average printing sheet saving rate of the information processing devices 2 connected to the network for comparison. The achromatic printing function setting rate display zone 332B shows the achromatic printing function setting rate of the information processing device of concern according to the latest second aggregate calculation result stored in the storage section 212 and the average achromatic printing setting rate of the information processing devices 2 connected to the network for comparison.

Thus, if the information processing device 2 of concern has used a relatively small number of printing sheets in the printing processes, the information processing device 2 can inform the user of the printing sheet saving rate as the degree of contribution to ecology. That is, for a user who does not repeat wasteful printing, the information processing device 2 can urge such a user to further utilize the aggregate printing function and the double-sided printing function.

Like the first resources saving function selection window described above, the second resources saving function selection window 34 has a print condition display zone 341, a resources saving status display zone 342, a printing sheet saving zone 343, a coloring material saving zone 344, and a print start OK button 345. Like the aggregate printing function setting zone 333A described above, an aggregate printing function setting zone 343A receives entry of setting related to the aggregate printing function for printing of printing data in an amount of plural pages on one side of a printing sheet by scaling the printing data down. Like the double-sided printing function setting zone 333B described above, a double-sided printing function setting zone 343B receives entry of setting related to the double-sided printing function for printing of different printing data items on both sides of an unused printing sheet. Like the coloring material saving zone 334 described above, the coloring material saving zone 344 receives entry of setting related to a function that can contribute to the resources saving by reducing the amount of usage of a coloring material, such as toner or ink, in a printing process carried out by each printer 1.

The print start OK button 345 is operated when the user gives a definitive instruction to start printing by the printer 1. In response to the operation on the print start OK button 335, image data is converted to printing data by functions set and is outputted to the printer 1.

The resources saving status display zone 342 displays the status of the resources saving in printing processes having been performed by the printer 1. The resources saving status display zone 342 includes a printing sheets usage display zone 342A and an achromatic printing function setting rate display zone 342B. Here, the printing sheets usage display zone 342A shows the total number of printing sheets used by the information processing device of concern according to the latest second aggregate calculation result stored in the storage section 212 and the average number of printing sheets used by the information processing devices 2 connected to the network for comparison. The achromatic printing function setting rate display zone 342B shows the achromatic printing function setting rate of the information processing device of concern according to the latest second aggregate calculation result stored in the storage section 212 and the average achromatic printing setting rate of the information processing devices 2 connected to the network for comparison.

Thus, if the information processing device 2 of concern has used a large number of printing sheets in the printing processes, the information processing device 2 informs the user of the total number of printing sheets used. That is, for a user who repeats wasteful printing with a high probability, the information processing device 2 can inform the user of a high probability of wasteful printing. Therefore, it is possible to impart such a user with the consciousness that the degree of contribution to the resources saving should be increased by reducing wasteful printing.

When any one of the resources saving buttons 41 to 45 in the first resources saving function selection window 33 (or the second resources saving function selection window 34) is operated (step S24), the control section 211 of the information processing device 2 changes setting so as to use the function corresponding to the button operated (step S25).

When the print start OK button 335 (or 345) in the first resources saving function selection window 33 (or the second resources saving function selection window 34) is operated (step S26), the control section 211 converts image data in the storage section 212 to printing data (step S27) and then outputs the printing data to the printer 1 (step S28). Thereafter, the control section 211 closes the first resources saving function selection window 33 (or the second resources saving function selection window 34) and the print window 31 (steps S29 and S30) to terminate the process.

Upon receipt of the printing data transmitted from the information processing device 2, the printer 1 performs printing based on the printing data received. Subsequently, the printer 1 informs the managing device 5 of a print log of the printing process carried out this time.

When the aggregate printing function (2-Up or 4-Up printing function) is currently alive, the control section 211 omits is displaying the aggregate printing function setting zone 333A (or 343A) in the printing sheet saving zone 333 (or 343). When the double-sided printing function is currently alive in addition to the aggregate printing function, the control section 211 omits displaying the aggregate printing function setting zone 333A (or 343A) and the double-sided printing function setting zone 333B (or 343B) in the printing sheet saving zone 333 (or 343). In this case, if the aggregate printing function is not alive, only the double-sided printing function setting zone 333B (or 343B) is omitted from the printing sheet saving zone 333 (or 343). If the achromatic printing function is alive, the control section 211 omits displaying the coloring material saving zone 334 (or 344).

If, for example, the saddle-stitch binding and printing function is alive for printing image data of A4 size per page on both sides of an A3 sheet two pages by two pages, the control section 211 omits displaying the aggregate printing function setting zone 333A (or 343A) and the double-sided printing function setting zone 333B (or 343B) in the printing sheet saving zone 333 (or 343). This is because the printing form desired by the user is not suitable for the printing sheet saving. For the same reason, if the saddle-stitch binding and achromatic printing function is alive in step S21, the process proceeds to step S27 by skipping steps S20 to S26 because there is no need to receive entry of selection of the achromatic printing function and, hence, there is no need to display the resources saving function selection window 33.

According to the process described above, when the user gives an instruction to start printing by way of the print window 31 displayed by the printer driver 213B, the resources saving function selection window 33 is displayed at the frontmost position for receiving entry of selection of a function that is more contributable to the resources saving than the function currently alive. Thus, the user can easily recognize the function that is more contributable to the resources saving than the function current alive and can easily select that function. Therefore, it is possible to urge the user to save resources.

When converting image data to printing data so that the printer 1 can realize a part or all of the functions which can contribute to the resources saving, the information processing device 2 may output to the printer 1 the printing data or the image data together with a command to cause the printer 1 to perform a part or all of the functions set, in response to operation on the print start OK button 335 (or 345).

The double-sided printing function includes causing the printer 1 to turn a printing sheet upside down and again feed the printing sheet thus turned upside down. For this reason, when the double-sided printing function is currently selected, the information processing device 2 outputs to the printer 1 a command to cause the printer 1 to perform the double-sided printing function.

It does not matter whether or not the printing control program 213C forms part of the printer driver 212B. It is possible that the printing control program 213C is independent of the printer driver 212B and operates cooperatively with any one of plural printer drivers installed in the program storage section 213 of the information processing device 2.

The printing control program 213C need not necessarily be installed in the information processing device 2 and may be installed either in the printer 1 provided with a display or in a print server on the network.

The printing control program according to the present invention is also applicable to a printing system including a printer having an achromatic printing function only. In such a case, the achromatic printing button 45 of the resources saving function selection window 33 (or 34) can be eliminated.

The resources saving function selection window 33 (or 34) may be provided with a zone for receiving entry of selection of a function for using a printed sheet having one side already printed and entry of selection of a function of lowering the print quality.

The foregoing embodiment is illustrative in all points and should not be construed to limit the present invention. The scope of the present invention is defined not by the foregoing embodiment but by the following claims. Further, the scope of the present invention is intended to include all modifications within the scopes of the claims and within the meanings and scopes of equivalents.

What is claimed is:

1. An information processing device which requests a printer connected thereto via a network to carry out a printing process, comprising:
   a storage section configured to store therein a result of aggregate calculation of items of information on printing processes which the information processing device has requested the printer to carry out;
   a determination section configured to determine whether or not the number of printing sheets used in printing processes having been requested by the information processing device during a predetermined determination period is more than a reference level based on the result of aggregate calculation stored in the storage section when the information processing device receives entry of an instruction to print to be forwarded to the printer; and a display control section configured to cause a display to provide a first screen informing a user of a printing sheet saving rate in the printing processes having been requested by the information processing device during the predetermined determination period in response to a determination by the determination section that the number of printing sheets used is not more than the reference level, while causing the display to provide a second screen informing the user of the number of printing sheets used in the printing processes having been requested by the information processing device during the predetermined determination period in response to a determination by the determination section that the number of printing sheets used is more than the reference level.

2. A printing system comprising:

a plurality of information processing devices each configured to request a printer connected thereto via a network to carry out a printing process, and a managing device configured to obtain a print log having a record of items of information on each of printing processes carried out by the printer, wherein:

the managing device includes:

an aggregate calculation section which performs aggregate calculation of the items of information on the printing processes based on the print logs obtained from the printer with respect to each of the information processing devices; and an aggregate calculation result informing section which informs each of the information processing devices of a result of the aggregate calculation performed by the aggregate calculation section; and each of the information processing devices includes:

a storage section configured to store therein the result of aggregate calculation informed from the managing device;

a determination section configured to determine whether or not the number of printing sheets used in printing processes having been requested by the information processing device of concern during a predetermined determination period is more than a reference level based on the result of aggregate calculation stored in the storage section when the information processing device of concern receives entry of an instruction to print to be forwarded to the printer; and a display control section configured to cause a display to provide a first screen informing a user of a printing sheet saving rate in the printing processes having been requested by the information processing device of concern during the predetermined determination period in response to a determination by the determination section that the number of printing sheets used is not more than the reference level, while causing the display to provide a second screen informing the user of the number of printing sheets used in the printing processes having been requested by the information processing device of concern during the predetermined determination period in response to a determination by the determination section that the number of printing sheets used is more than the reference level.

3. The printing system according to claim 2, wherein each of the first and second screens provided by the display of each of the information processing devices includes an image of a selection entry member for receiving entry of selection of a print form which uses a smaller number of printing sheets than a print form currently selected on each of the screens.

4. The printing system according to claim 3, wherein the image of the selection entry member is an image for receiving entry of selection of an aggregate printing function for collectively printing a plurality of print pages on one side of a printing sheet and a double-sided printing function for printing images on both sides of a printing sheet.

5. The printing system according to claim 2, wherein the reference level established in the determination section of each of the information processing devices is an average number of printing sheets used during the determination period.

6. A printing control method for use by an information processing device configured to request a printer connected thereto to carry out a printing process, the method comprising:

a determination step of determining whether or not the number of printing sheets used in printing processes which the information processing device has requested the printer to carry out during a predetermined determination period is more than a reference level based on a result of aggregate calculation of items of information on the printing processes stored in a storage section when the information processing device receives entry of an instruction to print to be forwarded to the printer; and a display step of causing a display to provide a first screen informing a user of a printing sheet saving rate in the printing processes having been requested by the information processing device during the predetermined determination period in response to a determination by the determination section that the number of printing sheets used is not more than the reference level, while causing the display to provide a second screen informing the user of the number of printing sheets used in the printing processes having been requested by the information processing device during the predetermined determination period in response to a determination by the determination section that the number of printing sheets used is more than the reference level.

7. A printing control method for use by a printing system including a plurality of information processing devices each configured to request a printer connected thereto via a network to carry out a printing process, and a managing device configured to obtain a print log having a record of items of information on each of printing processes carried out by the printer, the method comprising the steps of:

causing the managing device to perform steps including:

an aggregate calculation step of performing aggregate calculation of the items of information on the printing processes based on the print logs obtained from the printer with respect to each of the information processing devices; and an aggregate calculation result informing step of informing each of the information processing devices of a result of the aggregate calculation performed in the aggregate calculation step; and causing each of the information processing devices to perform steps including:

an aggregate calculation result storing step of storing in a storage section the result of aggregate calculation informed from the managing device;

a determination step of determining whether or not the number of printing sheets used in printing processes having been requested by the information processing device of concern during a predetermined determination period is more than a reference level based on the result of aggregate calculation stored in the storage section when the information processing device of concern receives entry of an instruction to print to be forwarded to the printer; and a display control step of causing a display to provide a first screen informing a user of a printing sheet saving rate in the printing processes having been requested by the information processing device of concern during the predetermined determination period in response to a determination by the determination section that the number of printing sheets used is not more than the reference level, while causing the display to provide a second screen informing the user of the number of printing sheets used in the printing processes having been requested by the information processing device of concern during the predetermined determination period in response to a determination by the determination section that the number of printing sheets used is more than the reference level.

* * * * *